(12) United States Patent  
Wernersson (10) Patent No.: US 8,089,694 B2
(45) Date of Patent: Jan. 3, 2012

(54) OPTICAL DEVICE STABILIZER (75) Inventor: Mats Göran Henry Wernersson, Helsingborg (SE)

(73) Assignee: Sony Ericsson Mobile Communications AB, Lund (SE)

( * ) Notice: Subject to any disclaimer, the term of this patent is extended or adjusted under 35 U.S.C. 154(b) by 1166 days.

(21) Appl. No.: 11/844,671

(22) Filed: Aug. 24, 2007

(65) Prior Publication Data

US 2009/0052037 A1 Feb. 26, 2009

(51) Int. Cl.
G02B 27/64 (2006.01)

(52) U.S. Cl. .... 359/554; 396/55; 455/556.1; 455/550.1; 455/575.1

(58) Field of Classification Search .................. 359/554; 396/55; 455/575.1, 550.1, 556.1
See application file for complete search history.

(56) References Cited

U.S. PATENT DOCUMENTS

| 5,414,444 | A | 5/1995 | Britz |
| 5,877,806 | A * | 3/1999 | Kawano ..................... 348/219.1 |
| 7,538,326 | B2 * | 5/2009 | Johnson et al. .......... 250/370.08 |
| 7,777,782 | B2 * | 8/2010 | Eromaki .................... 348/208.4 |
| 2006/0033818 | A1 | 2/2006 | Wada et al. |
| 2006/0257129 | A1 * | 11/2006 | Shibatani ....................... 396/55 |
| 2006/0285837 | A1 | 12/2006 | Mashima et al. |

FOREIGN PATENT DOCUMENTS

| DE | 2239426 | 2/1974 |
| JP | 07274056 | 10/1995 |
| WO | 2007091112 | 8/2007 |

OTHER PUBLICATIONS

International Preliminary Report on Patentability from corresponding International Application No. PCT/IB08/000608.
International Search Report and Written Opinion from corresponding International Application No. PCT/IB08/000608.

* cited by examiner

*Primary Examiner* — Nghi Ly
(74) *Attorney, Agent, or Firm* — Renner, Otto, Boisselle & Sklar, LLP (57) ABSTRACT

A stabilizer for an optical device that forms part of an electronic device may include a platform that has an optical device mounted thereon. A gimbal mount may retain the platform so that the platform is pivotal about a first axis and the gimbal mount being further pivotal about a second axis so that the optical device is pivotal about both the first and second axes. A first actuator may be controlled to manage movement of the optical device about the first axis and a second actuator may be controlled to manage movement of the optical device about the second axis.

18 Claims, 5 Drawing Sheets

OPTICAL DEVICE STABILIZER

TECHNICAL FIELD OF THE INVENTION

The technology of the present disclosure relates generally to stabilizers and, more particularly, to a system and method for stabilizing an optical device against the effects of vibration and movement by a user of the optical device.

DESCRIPTION OF THE RELATED ART

Mobile and/or wireless electronic devices are becoming increasingly popular. For example, mobile telephones, portable media players and portable gaming devices are now in wide-spread use. In addition, the features associated with certain types of electronic devices have become increasingly diverse. For example, many mobile telephones now include cameras.

When a user holds an electronic device to take a photograph, movement of the user (e.g., shaking of the user's hands) may lead to "camera shake," which can result in poor image quality. Image stabilization techniques to compensate for camera shake have been attempted, but with limited success in small, hand-held devices, such as mobile telephones that include a digital camera.

Conventional image stabilization techniques fall into two general categories, including digital stabilization and opto-mechanical stabilization. Opto-mechanical stabilization physically manipulates a part of the optical system to effectuate image stabilize and is generally considered to perform better than digital stabilization. Digital single lens reflex cameras and some compact digital cameras have employed opto-mechanical image stabilization. Unfortunately, opto-mechanical image stabilization relies on mechanical components that are too large to be a viable choice for digital cameras that are included in most mobile telephones. In particular, conventional opto-mechanical stabilization techniques move a lens or group of lenses in the optical pathway in order to compensate for camera shake. Another approach is to move an image sensor to compensate for camera shake at the image plane. As indicated, these systems are not easily adaptable to a camera phone. This is because the scale of the imaging components in a camera phone is very small compared to larger camera assemblies found in dedicated cameras. As a result, moving one of a lens or a sensor to successfully counter camera shake in a camera phone would involve a degree of precision that is not readily achieved.

Since opto-mechanical image stabilization has traditionally not been considered an option for camera phones, camera phone manufacturers have opted for digital image stabilization even though this leads to a sacrifice in stabilization performance. In fact, as far as the applicant is aware, there are no camera phones that are currently on the market that employ opto-mechanical image stabilization.

SUMMARY

To improve stabilization for relatively small optical devices, the present disclosure describes an improved stabilizer. In one embodiment, the stabilizer includes an optical device platform upon which the entire optical device sits. In the case of a camera, the optical device may be a camera module that includes optical elements (e.g., lenses) and an image sensor. The platform is retained by a gimbal mount in an arrangement such that the optical device may pivot with respect to at least two axes. The movement of the optical device may be controlled by actuators, such as electromagnetic actuators, piezoelectric actuators or shape memory alloy (SMA) actuators. A gyro sensor may be used to detect movement of the platform, and hence the optical device. Output signals from the gyro sensor may be input to a controller that controls the actuators in a manner to keep the output signal from the unchanged, such as a zero value indicative of an initial position of the platform and the optical device.

According to one aspect of the disclosure a stabilizer for an optical device that forms part of an electronic device includes a platform wherein the optical device mounted on the platform; a gimbal mount that retains the platform so that the platform is pivotal about a first axis and the gimbal mount being further pivotal about a second axis so that the optical device is pivotal about both the first and second axes; a first actuator that is controlled to manage movement of the optical device about the first axis; and a second actuator that is controlled to manage movement of the optical device about the second axis.

According to one embodiment, the stabilizer further includes a gyro sensor mounted with respect to the platform and wherein the gyro sensor outputs signals indicative of movement of the optical device about the first and second axes.

According to one embodiment, the stabilizer further includes a controller that controls the first and second actuators in accordance with the output signals of the gyro sensor.

According to one embodiment of the stabilizer, the controller controls the first and second actuators to minimize change in the output signals from the gyro sensor.

According to one embodiment of the stabilizer, the stabilizer does not include position sensors to provide input to the controller indicative of relative position of any of the optical device, the platform or the gimbal mount.

According to one embodiment of the stabilizer, the gimbal mount is hingably connected to a mounting bracket that is secured to a printed circuit board of the electronic device.

According to one embodiment of the stabilizer, the electronic device is a mobile telephone.

According to one embodiment of the stabilizer, the optical device is a camera module that includes a sensor and at least one focusing lens.

According to one embodiment of the stabilizer, the optical device is an illumination source for generating a light beam to be used by a user of the electronic device as a pointer.

According to one embodiment of the stabilizer, the illumination source is a laser diode.

According to one embodiment of the stabilizer, there are two optical devices mounted on the platform.

According to one embodiment of the stabilizer, the optical devices are a camera module and an illumination source.

According to one embodiment of the stabilizer, the actuators are electromagnetic actuators.

According to one embodiment of the stabilizer, the first actuator has a magnet and a coil that are mounted with respect to the platform to control movement about the first axis and the second actuator has a magnet and a coil that are mounted with respect to the gimbal mount to control movement about the second axis.

According to one embodiment of the stabilizer, the actuators are piezoelectric actuators.

According to one embodiment of the stabilizer, the actuators are shape memory alloy (SMA) actuators.

According to one embodiment of the stabilizer, the first actuator has an SMA member connected between the gimbal mount and the platform to control movement about the first axis and the second actuator has an SMA member connected between the gimbal mount and a fixed point to control movement about the second axis.

According to another aspect of the disclosure, a mobile telephone includes call circuitry to receive and place calls over a network; and a laser pointer that projects a beam of light at a target selected by a user of the mobile telephone.

According to one embodiment of the mobile telephone, an illumination source for the laser pointer is mounted on a stabilizer to reduce movement of the projected beam of light resulting from shaking of a user's hand.

According to one embodiment, the mobile telephone further includes a camera assembly that takes digital photographs.

These and further features will be apparent with reference to the following description and attached drawings. In the description and drawings, particular embodiments of the invention have been disclosed in detail as being indicative of some of the ways in which the principles of the invention may be employed, but it is understood that the invention is not limited correspondingly in scope. Rather, the invention includes all changes, modifications and equivalents coming within the scope of the claims appended hereto.

Features that are described and/or illustrated with respect to one embodiment may be used in the same way or in a similar way in one or more other embodiments and/or in combination with or instead of the features of the other embodiments.

The terms "comprises" and "comprising," when used in this specification, are taken to specify the presence of stated features, integers, steps or components but do not preclude the presence or addition of one or more other features, integers, steps, components or groups thereof.

DETAILED DESCRIPTION OF EMBODIMENTS

Embodiments will now be described with reference to the drawings, wherein like reference numerals are used to refer to like elements throughout. It will be understood that the figures are not necessarily to scale.

Described below in conjunction with the appended figures are various embodiments of an improved stabilizer. The stabilizer may be a mechanical stabilizer to improve stabilization optical devices, such as digital still cameras, digital video cameras, laser pointers, and so forth. As such, the stabilizer sometime may be referred to as an opto-mechanical stabilizer. The stabilizer is particularly well suited for stabilizing relatively small optical devices, such as a digital camera module found in a mobile telephone.

The disclosed stabilizer moves the entire optical device (e.g., a camera module in the case of a digital camera or a laser diode in the case of a laser pointer) to compensate for shake. This differs from conventional approaches that move an individual camera component, such as a lens or a sensor. In mobile telephone and other small scale applications, moving the entire optical device may be accomplished while maintaining a reasonably low amount about of power consumption.

As will be described below, the disclosed stabilizer may employ a simple control arrangement that does not rely on position sensors. For instance, in the disclosed arrangement a gyro sensor may be mounted with respect to the optical device so that the gyro sensor has movements (and corresponding output signals) that directly correspond to the movements of the optical device. As such, a closed loop control system may be employed. Position sensors are used in conventional mechanical image stabilization systems to keep track of the exact position of the moving part or parts. The position values output by these sensors are compared against movement values output by a gyro sensor. From this data, control signals to control movement actuators are computed using relatively advanced processing techniques.

In one embodiment, the disclosed stabilizer includes an optical device platform upon which the entire optical device sits. In the case of a camera, the optical device may be a camera module that includes optical elements (e.g., lenses) and an image sensor. The platform is retained by a gimbal mount so that the optical device may pivot with respect to at least two axes. The movement is controlled by actuators, such as electromagnetic actuators, piezoelectric actuators or shape memory alloy (SMA) actuators. A gyro sensor may be used to detect movement of the platform, and hence the optical device. Output signals from the gyro sensor may be input to a controller that controls the actuators in a manner to keep the output signal from the unchanged, such as a zero value indicative of an initial position of the platform and the optical device.

The stabilizer will be primarily described in the context of stabilizing a digital camera (e.g., a digital still camera and/or a digital video camera) for a mobile telephone. It will be appreciated that the stabilizer may be used in other operational contexts such as, but not limited to, a dedicated camera, a laser pointer, a remote control, a video game controller, a personal digital assistant (PDA), a media player, a gaming device and a computer. It is further noted that the interchangeable terms "electronic equipment" and "electronic device" include portable radio communication equipment. The term "portable radio communication equipment," which hereinafter is referred to as a "mobile radio terminal," includes all equipment such as mobile telephones, pagers, communicators, electronic organizers, PDAs, smartphones, portable communication apparatus or the like.

Figure 1:
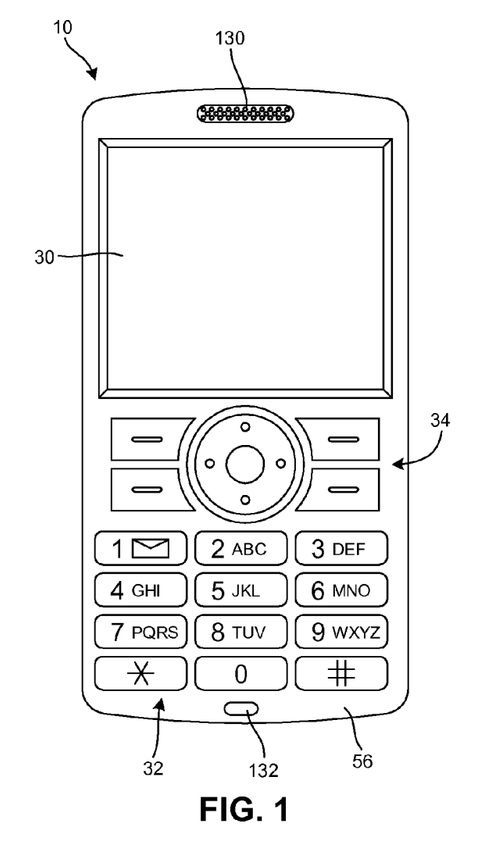
FIGS. 1 and 2 are respectively a front view and a rear view of an exemplary electronic device that includes a stabilized camera module for a camera assembly.
Figure 2:
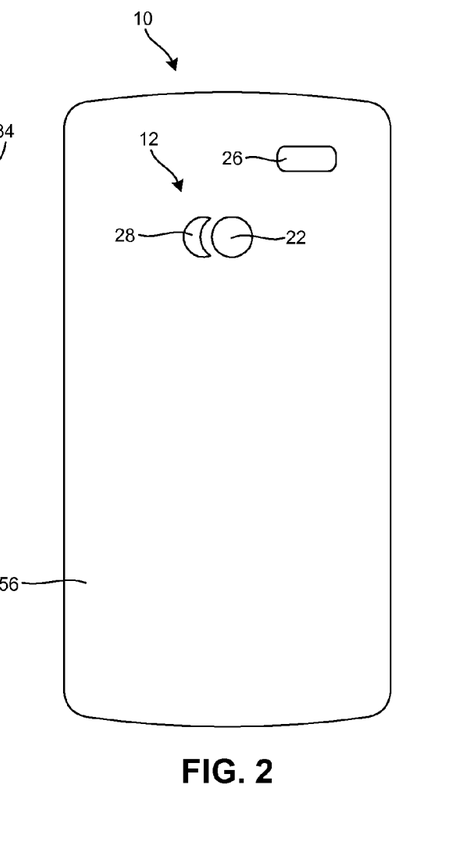

Referring initially to FIGS. 1 and 2, an electronic device 10 is shown. The illustrated electronic device 10 is a mobile telephone. The electronic device 10 includes a camera assembly 12 for taking digital still pictures and/or digital video clips. Therefore, it is highlighted that the electronic device 10 need not be a mobile telephone, but could be a dedicated camera or some other device as indicated above.

Figure 3:
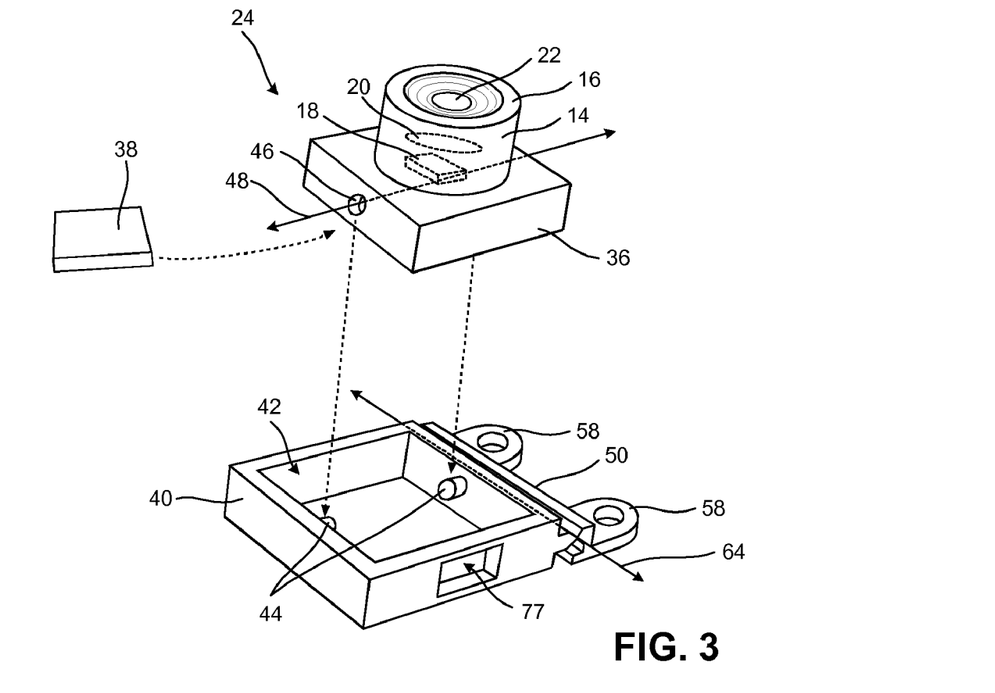
FIG. 3 is an exploded partial view of an exemplary stabilizer for an optical device.

With additional reference to FIG. 3, the electronic device 10 may include an optical device 14. In the illustrated embodiment, the optical device 14 is a camera module 16 of the camera assembly 12. The camera module 16 may include a sensor 18 that captures images of a scene contained within a field of view of the camera module 16, a lens assembly 20 having one or more lenses to focus the scene onto the sensor 18 and a window 22 that serves a protective cover for the camera module 16. The window 22 may also function as a lens and/or a filter. The camera module 16 may include other optical components, such as filters, prisms, mirrors, focusing and/or optical zooming mechanics, etc.

The optical device 14 (e.g., the camera module 16 in the illustrated embodiment) is mounted on a stabilizer 24 as will be described in detailed. The stabilizer 24 may be a mechanical stabilizer for an optical device or some other type of device for which stabilization is desired.

It will be appreciated that the camera assembly 12 may include additional components that may be mounted on the stabilizer 24 or that may be retained by the electronic device 10 separately from the stabilizer 24. For instance, the camera assembly 12 may include an electronic controller (not illustrated) that controls operation of the camera module 16 and other camera assembly 12 operations. Other components of the camera assembly 12 include, for example, a flash 26, a light meter 28, a display 30 for functioning as an electronic viewfinder and as part of an interactive a user interface, a keypad 32 and/or buttons 34 for accepting user inputs, an optical viewfinder (not shown), and any other components commonly associated with cameras.

Figure 4:
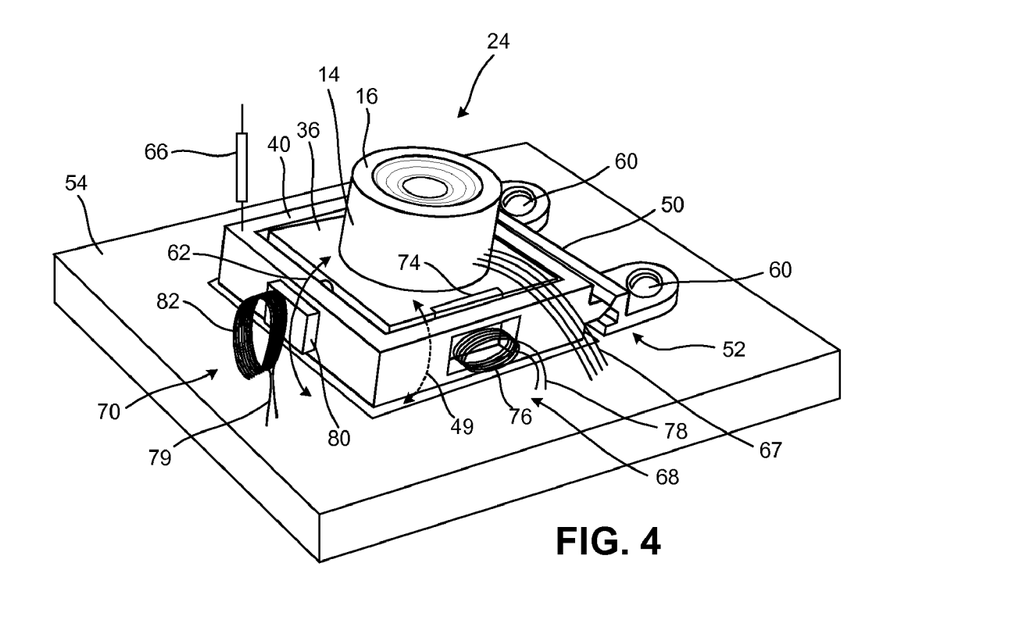
FIG. 4 is a perspective view of the stabilizer of FIG. 3 where the stabilizer includes electromagnetic actuators.

Referring now to FIGS. 3 and 4, the camera module 16 may be mounted to a stage or platform 36. A gyro sensor 38 for outputting signals indicative of camera module 16 movement in at least two rotational directions also may be mounted to the platform 36. For instance, the camera module 16 may be mounted on top of the platform 36 and the gyro sensor 38 may be mounted in a recess in the bottom of the platform 38. Alternatively, the gyro sensor 38 may be mounted to some other surface of the platform or to the camera module 16.

The platform 36 is pivotally mounted to a gimbal mount 40. For instance, the gimbal mount 40 may include a recess or, as shown in the illustrated embodiment, a through hole 42 in which the platform is placed. The platform 40, therefore, may at least partially surround edges of the gimbal mount 36. While the platform 36 and the gimbal mount 40 are illustrated as being square, they may have alternative shapes, such as circular shapes. For establishing a pivotal connection between the platform 36 and the gimbal mount 40, the gimbal mount 40 may include pins 44 (or other type of detent) that fit in respective recesses 46 (or other type of aperture or hole) of the platform 36. The pins 44 and the recesses 46 may be reversed so that the platform 36 includes the pins 44 and the gimbal mount 40 includes the recesses 46.

The pins 44 and recesses 46 are aligned so that the platform 36, and hence the camera module 16, may have a first movement. The first movement may be a tilting with respect to a first axis 48 of the opto-mechanical stabilizer 24. The first axis 48 may be represented by a line drawn through the pins 44 and recesses 46. As such, the first movement also may be described as a pivoting or a rotation about the first axis 48 as is represented by arrow 49. It is noted that in the illustrated embodiment, the first axis 48 travels through a center line of the camera module 16. Alternatively, the first axis 48 may be offset from the center line of the camera module 16.

The gimbal mount 40 may be hingably connected to a mounting bracket 50 with a hinge 52. The mounting bracket 50 may be secured to a component of the electronic device 10, such as a printed circuit board 54. In other embodiments, the mounting bracket 50 may be connected to a housing 56 (FIGS. 1 and 2) of the electronic device 10. In the illustrated embodiment, the mounting bracket 50 may include tabs 58 that are secured to the printed circuit board 54 with screws 60. Other fastening techniques are possible, such as rivets, adhesive, solder joints and so forth.

In one embodiment, the gimbal mount 40 and the mounting bracket 50 are integrally formed from a polymer material. A thinned section between the gimbal mount 40 and the mounting bracket 50 may create a flexible joint that forms the hinge 52. Other types of hinge structures may be employed, such as a pinned assembly.

The gimbal mount 40 may move with respect to the mounting bracket 50 to that the platform 36, and hence the camera module 16, may have a second movement represented by arrow 62. The second movement may be a tilting with respect to a second axis 64 of the stabilizer 24. The second axis 64 may be represented by a line drawn through the pivot point of the hinge 52. As such, the second movement also may be described as a pivoting or a rotation about the second axis 64. It is noted that in the illustrated embodiment, the second axis 64 is offset from the center line of the camera module 16. Also, the second axis 64 is illustrated as transverse to the first axis 48. In particular, in the illustrated embodiment, the second axis 64 is perpendicular or orthogonal to the first axis 48. The first axis 48 and the second axis 64 may have different elevations.

The stabilizer 24 may be urged toward an initial position by a spring 66. In the attached drawings, the spring 66 is schematically illustrated. In one embodiment, the spring 66 is a coil spring with one end attached to the gimbal mount 40 and the other end attached to the housing 56 of the electronic device 10 or some other member, such as the printed circuit board 54. In another embodiment, the spring 66 or an additional spring may be attached to the platform 36. Also, another type of spring (e.g., a leaf spring) and/or movement dampeners may be used. Also, limit stops may be used to limit movement of the platform 36 with respect to the gimbal mount 40 and/or limit movement of the gimbal mount 40 with respect to the mounting bracket 50 or some other member.

Conductors 67 may operatively connect the camera module 16 to camera control circuitry via the printed circuit board 54. For instance, the conductors may deliver power and control signals to the sensor 18 and any electro-mechanical devices used to control focus and/or optical zoom of the camera module 16. The conductors also may deliver signals containing image information from the sensor 18 to the control circuitry for processing and/or storage as part of an image file. Although not shown in the figures, additional conductors may couple the gyro sensor 38 to the control circuitry so that output signals of the gyro sensor 38 may be input to the control circuitry. The conductors 67 between the camera module 16 and the printed circuit board 54 and the between the gyro sensor 38 and the printed circuit board 54 may be flexible to allow movement of the camera module 16 relative to the printed circuit board 54.

The movement of the camera module 16 may be controlled by a first actuator 68 and a second actuator 70. The first actuator 68 may control movement of the platform 36 relative to the gimbal mount 40 by controlling the pivoting movement 49 about the first axis 48. The second actuator 70 may control movement of the gimbal mount 40 relative to the mounting bracket 50 by controlling the pivoting movement 62 about the second axis 64.

In the embodiment of FIG. 4, the first actuator 68 and the second actuator 70 are electromagnetic actuators. The first actuator 68 may include a permanent magnet 74 mounted to the platform 36 and a wire coil 76 (e.g., a voice coil) positioned adjacent the permanent magnet 74. The coil 76 may be retained in an opening 77 (FIG. 3) in the gimbal mount 40. In one embodiment, the coil 76 may include leads 78 that are connected to the printed circuit board 54 to receive a control signal. The leads 78 may be flexible to permit movement of the gimbal mount 40 relative to the printed circuit board 54.

Similarly, the second actuator 70 may include a permanent magnet 80 mounted to the gimbal mount 40 and a wire coil 82 positioned adjacent the permanent magnet 82. The coil 82 may include leads 79 that are connected to the printed circuit board 54 to receive a control signal.

The control signals to the actuators 68, 70 may respectively be voltage signals that cause current to flow through the coils 68, 70, thereby inducing corresponding magnetic fields. The induced magnetic fields may repel or attract the corresponding magnets 74, 80 so as to control motion of the camera module 16. The direction of movement of the magnets 74, 80 with respect to the corresponding coils 68, 70 may be controlled based on the polarity of the control signals. Also, the strength of the induced magnetic fields, which corresponds to the rate of movement, may be controlled by the amplitude of the control signals. That is, the camera module 16 may be tilted proportionally to the strength and polarity of the electrical current that is applied to the coils 68, 70.

Figure 5:
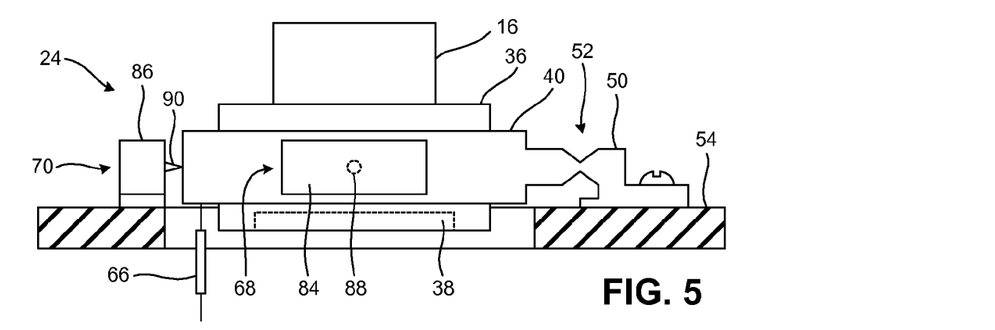
FIG. 5 is a side view of the stabilizer of FIG. 3 where the stabilizer includes piezoelectric actuators and where the stabilizer is mounted to a circuit board that is shown partially cut away.

With additional reference to FIG. 5, FIG. 5 shows an embodiment where the first actuator 68 and the second actuator 70 are implemented with piezoelectric actuators 84 and 86, respectively. Piezoelectric actuators may operate faster and more accurately than electromagnetic actuators, and may operate with lower power consumption. But present cost and manufacturing yield for piezoelectric actuators is less favorable than for electromagnetic actuators.

In general, the application of current to a piezoelectric actuator results in the creation of mechanical stress that may be used to effectuate a desired mechanical motion. In the illustrated embodiment, the first piezoelectric actuator 84 is mounted in the opening 77 (FIG. 3) of the gimbal mount 40 and is configured to move a member 88 (e.g., a "tip") in an elliptical path. The member 88 may be arranged to touch the platform 36 so that when the member 88 is moved, the platform 36 also moves. In one embodiment, the member 88 may be attached to both the first piezoelectric actuator 84 and the platform 36. Similarly, the second piezoelectric actuator 86 may be mounted on the printed circuit board 54 and may be configured to move a member 90 (e.g., a "tip") in an elliptical path. The member 90 may be arranged to touch the gimbal mount 40 so that when the member 90 is moved, the gimbal mount 40 also moves. In one embodiment, the member 90 may be attached to both the first piezoelectric actuator 86 and the gimbal mount 40. As will be appreciated, other piezoelectric actuation assemblies are available that may be suitable for use in the stabilizer 24.

Figure 6:
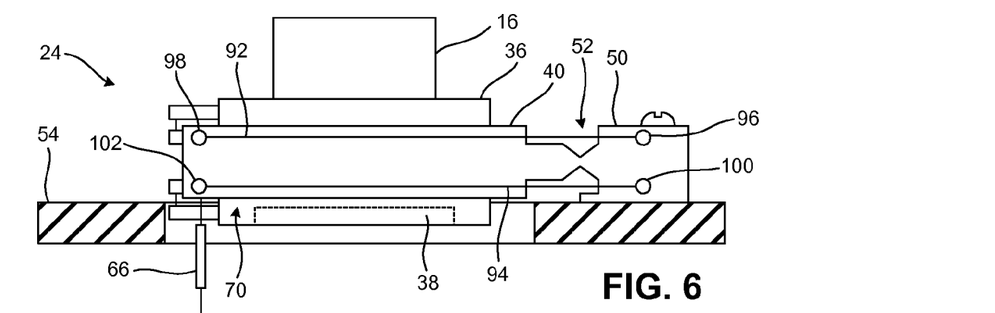
FIG. 6 is a side view of the stabilizer of FIG. 3 where the stabilizer includes shape memory alloy (SMA) actuators and where the stabilizer is mounted to a circuit board that is shown partially cut away.

With additional reference to FIG. 6, another embodiment for the second actuator 70 is illustrated. In this embodiment, the second actuator 70 may be implemented with one or more members that are made from shape memory alloy (SMA). In the illustrated embodiment, two SMA members 92 and 94 in the form of wires are illustrated. Wire SMA members are often referred to as "muscle wire" since they exhibit the property of shrinking in length when heated to a suitable temperature, which is typically about eighty degrees Celsius. Suitable wire SMA members are sold by Nitinol Devices and Components of Fremont, Calif., USA as well as other manufacturers and vendors.

Contraction of the SMA members 92 and 94 may be individually accomplished by passing an electrical current through the SMA member 92, 94 to be contracted. For instance, one end of the SMA member 92 may be connected to an electrical terminal referred to as a control terminal 96 and the other end of the SMA member 92 may be connected to a ground terminal 98. In the illustrated embodiment, the control terminal 96 is a post that is mounted to the mounting bracket 50 and the ground terminal 98 is a post that is mounted to the gimbal mount 40. The control and ground terminals 96, 98 may be reversed. When a voltage differential is present between the terminals 96, 98, current may flow through the SMA member 92 to heat the SMA member 92 and cause the SMA member 92 to shorten. The shortening of the SMA member 92 can result in upward tilting of the camera module 16 about the second axis 64 (FIG. 3). Similarly, one end of the SMA member 94 may be connected to an electrical terminal referred to as a control terminal 100 and the other end of the SMA member 92 may be connected to a ground terminal 102. In the illustrated embodiment, the control terminal 100 is a post that is mounted to the mounting bracket 50 and the ground terminal 102 is a post that is mounted to the gimbal mount 40. The control and ground terminals 100, 102 may be reversed. When a voltage differential is present between the terminals 100, 102, current may flow through the SMA member 94 to heat the SMA member 94 and cause the SMA member 94 to shorten. The shortening of the SMA member 94 can result in downward tilting of the camera module 16 about the second axis 64 (FIG. 3).

Figure 7:
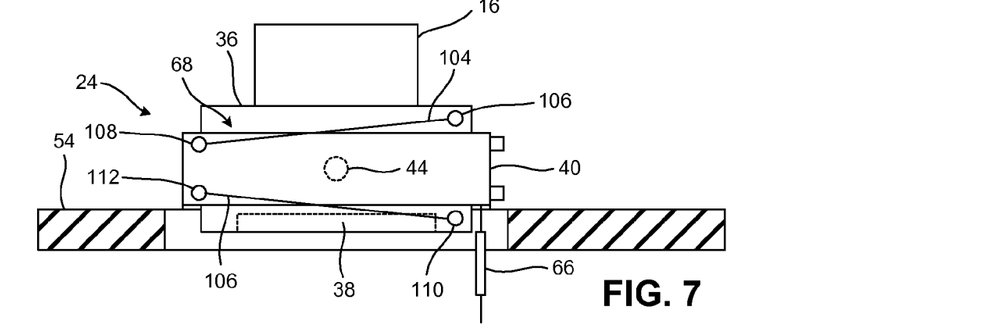
FIG. 7 is an end view of the stabilizer of FIG. 6.

With additional reference to FIG. 7, another embodiment for the first actuator 68 is illustrated. Similar to the embodiment of FIG. 6 for the second actuator 70, the embodiment of FIG. 7 for the first actuator 68 may be implemented with one or more members that are made from SMA. In the illustrated embodiment, two SMA members 104 and 106 in the form of wires are illustrated. One end of the SMA member 104 may be connected to an electrical terminal referred to as a control terminal 106 and the other end of the SMA member 104 may be connected to a ground terminal 108. In the illustrated embodiment, the control terminal 106 is a post that is mounted to the platform 36 and the ground terminal 108 is a post that is mounted to the gimbal mount 40. The control and ground terminals 106, 108 may be reversed. When a voltage differential is present between the terminals 106, 108, current may flow through the SMA member 104 to heat the SMA member 104 and cause the SMA member 104 to shorten. The shortening of the SMA member 104 can result in upward tilting of the camera module 16 about the first axis 48 (FIG. 3). Similarly, one end of the SMA member 106 may be connected to an electrical terminal referred to as a control terminal 110 and the other end of the SMA member 106 may be connected to a ground terminal 112. In the illustrated embodiment, the control terminal 110 is a post that is mounted to the platform 36 and the ground terminal 112 is a post that is mounted to the gimbal mount 40. The control and ground terminals 110, 112 may be reversed. When a voltage differential is present between the terminals 110, 112, current may flow through the SMA member 106 to heat the SMA member 106 and cause the SMA member 106 to shorten. The shortening of the SMA member 106 can result in downward tilting of the camera module 16 about the first axis 48 (FIG. 3).

Figure 8:
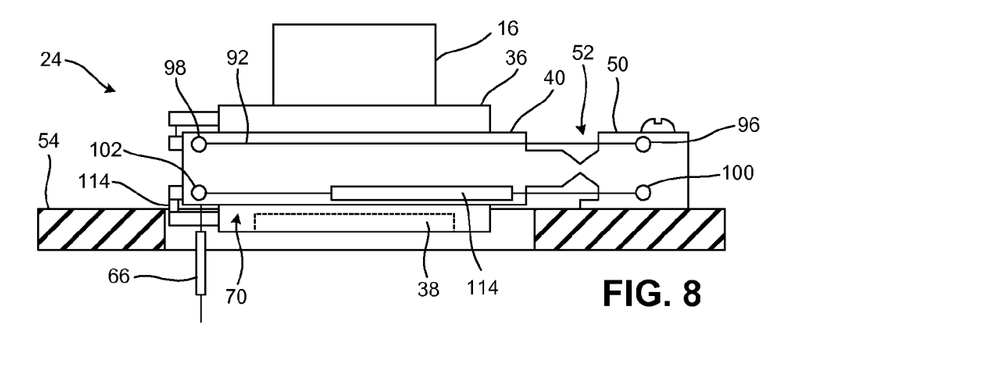
FIG. 8 is an exemplary alternative for the stabilizer of FIG. 6.

With additional reference to FIG. 8, one or more of the SMA members 92, 94, 104 and 106 may be replaced by a tensioning member, such as a spring 114. The embodiment of FIG. 8 shows that the SMA member 94 and the SMA member 106 are replaced by springs 114, which are schematically illustrated to represent coil springs. It will be appreciated that the SMA member 92 and the SMA member 104 may alternatively be replaced by springs 114, or some other combination of SMA members may be replaced. The control and ground terminals used to retain the ends of the spring(s) 114 may simply be posts and may not be electrically active. The spring force of the spring 114 may balance force from one of the SMA members 92, 94, 104 or 106 that is paired with the spring 114.

Figure 9:
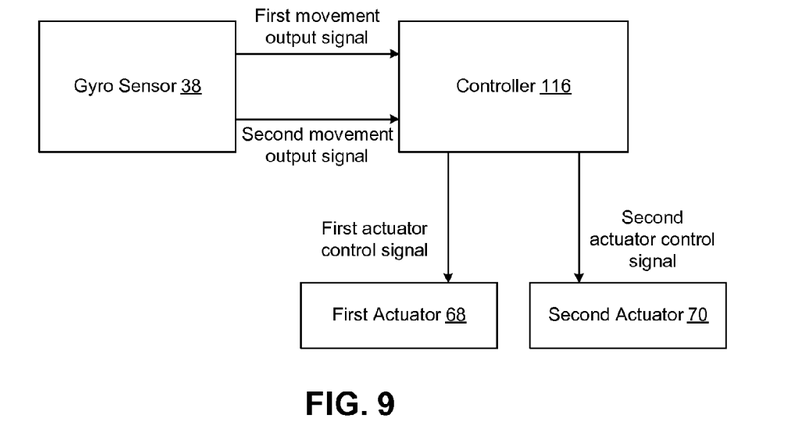
FIG. 9 is a schematic block diagram of an exemplary control circuit arrangement for the stabilizer of FIG. 3.

With additional reference to FIG. 9, shown is a control circuit arrangement for the stabilizer 24. A controller 116 may receive movement signals from the gyro sensor 38. In one embodiment, there may be two movement signals where one of the signals is indicative of movement about the first axis 48 and the other of the signals is indicative of movement about the second axis 64. It will be appreciated that other signal arrangements may be used. For example, the gyro sensor 38 may output signals for three orthogonal directions (e.g., movement in an X plane, a Y plane and a Z plane) and the controller 116 may analyze the output signals to derive signals that are indicative of movement about the first axis 48 and movement about the second axis 64.

In response to the movement signals that are input to the controller 116, the controller 116 may generate a signal or signals used to control the first actuator 68 and a signal or signals used to control the second actuator 70. When the actuators 68, 70 are electromagnetic actuators, the signals may be voltage signals of an appropriate polarity to generate magnetic fields used to counter movement of the camera module 16 as detected by the gyro sensor 38. Similarly, when the actuators 68, 70 are piezoelectric actuators, the signals may be voltage signals to cause movement of the members 88 and 90 to counter movement of the camera module 16 as detected by the gyro sensor 38. When the actuators 68, 70 are SMA actuators that each include two SMA members, there may be two control signals per SMA actuator (one signal per SMA member). The signals may be voltage signals to cause contraction of the appropriate SMA member(s) to counter movement of the camera module 16 as detected by the gyro sensor 38.

As indicated, movement of the stabilizer 24 may be controlled without use of one or more position sensors. In this embodiment, the gyro sensor 38 registers movements of the camera module 16, such as movement caused by shaking of the user's hands and the corrective movements of the actuators 68 and 70. The controller 116 may be configured to keep the output signals from the gyro sensor 38 as constant as possible. Constant signals from the gyro sensor 38 could tend to indicate no or little movement of the camera module 16. In one embodiment, the gyro sensor 38 and the controller 116 may be configured so that the controller 116 attempts to keep the signals from the gyro sensor 38 at zero values or some other values indicative of an initial or desired position. As will be appreciated, the system is arranged to cancel-out movements registered by the gyro sensor 38. As such, the stabilizer 24 may be considered to be "self-controlled" (e.g., operates without the use of position sensors) and is implemented as a closed loop control system.

In one embodiment, motion control of the stabilizer 24 may be activated only when the optical device 14 that is stabilized by the stabilizer 24 is active. For instance, when the optical device 14 is the camera module 16, the stabilizer 24 may actively operate to stabilize the camera module 16 when the camera assembly 12 is enabled and may not actively operate to stabilize the camera module 16 when the camera assembly 12 is not enabled. In addition, large movement of the electronic device 10 may be detected using, for example, accelerometers (not shown). Large movement of the electronic device 10 may be changes in position of the electronic device 10 in a relatively short period of time, such as may be experienced when a user is composing a photograph by moving the electronic device 10 to change the field of the view of the camera assembly 12 or may be experienced as a result of rough handling of the electronic device 10. During large movement of the electronic device, the stabilizer 24 may be deactivated to converse battery power. Alternatively, the stabilizer may remain active any time the camera assembly 12 is activated.

The controller 116 may be implemented with dedicated circuit components, in firmware, in software that is executed by a processor or a combination of circuit components, firmware and/or software. In one embodiment, the controller 116 may be combined with a controller that carries out additional tasks, such as operation of additional camera tasks (e.g., controlling exposure settings, managing image data from the sensor 18, etc.), operation of the electronic device 10 (e.g., in the case of mobile telephone, managing telephone calls and other mobile telephone functions), and so forth.

As indicated, the illustrated electronic device 10 shown in FIGS. 1 and 2 is a mobile telephone. Features of the electronic device 10, when implemented as a mobile telephone, will be described with additional reference to FIG. 10. The electronic device 10 is shown as having a "brick" or "block" form factor housing, but it will be appreciated that other housing types may be utilized, such as a "flip-open" form factor (e.g., a "clamshell" housing) or a slide-type form factor (e.g., a "slider" housing).

As indicated, the electronic device 10 may include the display 30. The display 30 displays information to a user such as operating state, time, telephone numbers, contact information, various menus, etc., that enable the user to utilize the various features of the electronic device 10. The display 30 also may be used to visually display content received by the electronic device 10 and/or retrieved from a memory 118 (FIG. 10) of the electronic device 10. The display 30 may be used to present images, video and other graphics to the user, such as photographs, mobile television content and video associated with games.

The keypad 32 and/or buttons 34 may provide for a variety of user input operations. For example, the keypad 32 may include alphanumeric keys for allowing entry of alphanumeric information such as telephone numbers, phone lists, contact information, notes, text, etc. In addition, the keypad 32 and/or buttons 34 may include special function keys such as a "call send" key for initiating or answering a call, and a "call end" key for ending or "hanging up" a call. Special function keys also may include menu navigation and select keys to facilitate navigating through a menu displayed on the display 30. For instance, a pointing device and/or navigation keys may be present to accept directional inputs from a user. Special function keys may include audiovisual content playback keys to start, stop and pause playback, skip or repeat tracks, and so forth. Other keys associated with the mobile telephone may include a volume key, an audio mute key, an on/off power key, a web browser launch key, a camera key, etc. Keys or key-like functionality also may be embodied as a touch screen associated with the display 30. Also, the display 30 and keypad 32 and/or buttons 34 may be used in conjunction with one another to implement soft key functionality.

The electronic device 10 may include call circuitry that enables the electronic device 10 to establish a call and/or exchange signals with a called/calling device, which typically may be another mobile telephone or landline telephone. However, the called/calling device need not be another telephone, but may be some other device such as an Internet web server, content providing server, etc. Calls may take any suitable form. For example, the call could be a conventional call that is established over a cellular circuit-switched network or a voice over Internet Protocol (VoIP) call that is established over a packet-switched capability of a cellular network or over an alternative packet-switched network, such as WiFi (e.g., a network based on the IEEE 802.11 standard), WiMax (e.g., a network based on the IEEE 802.16 standard), etc. Another example includes a video enabled call that is established over a cellular or alternative network.

The electronic device 10 may be configured to transmit, receive and/or process data, such as text messages, instant messages, electronic mail messages, multimedia messages, image files, video files, audio files, ring tones, streaming audio, streaming video, data feeds (including podcasts and really simple syndication (RSS) data feeds), and so forth. It is noted that a text message is commonly referred to by some as "an SMS," which stands for simple message service. SMS is a typical standard for exchanging text messages. Similarly, a multimedia message is commonly referred to by some as "an MMS," which stands for multimedia message service. MMS is a typical standard for exchanging multimedia messages. Processing data may include storing the data in the memory 118, executing applications to allow user interaction with the data, displaying video and/or image content associated with the data, outputting audio sounds associated with the data, and so forth.

Figure 10:
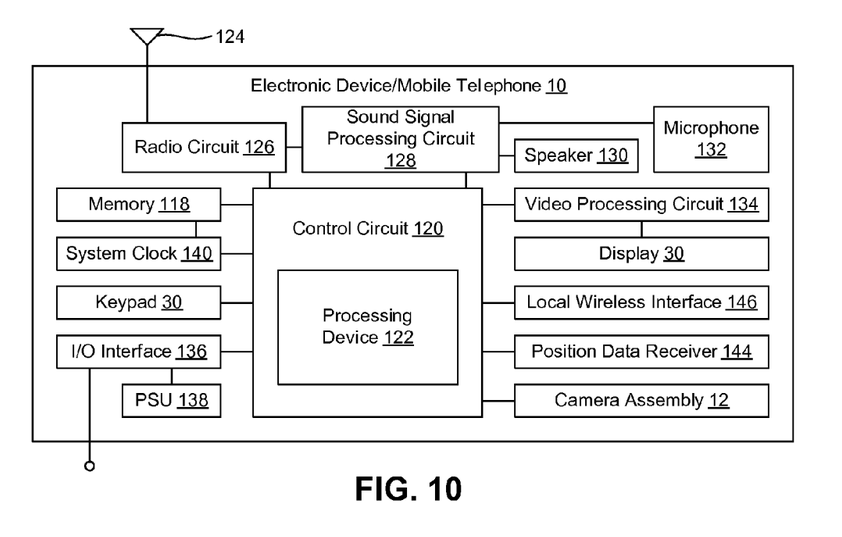
FIG. 10 is a schematic block diagram of the electronic device of FIGS. 1 and 2.

The electronic device 10 may include a primary control circuit 120 that is configured to carry out overall control of the functions and operations of the electronic device 10. The controller 116 may be combined with the control circuit 120 or may be implemented separately from the control circuit 120. The control circuit 120 may include a processing device 122, such as a central processing unit (CPU), microcontroller or microprocessor. The processing device 122 executes code stored in a memory (not shown) within the control circuit 120 and/or in a separate memory, such as the memory 118, in order to carry out operation of the electronic device 10.

Among other data storage responsibilities, the memory 118 may be used to store images captured by the camera assembly 12. Alternatively, the images may be stored in a separate memory. The memory 118 may be, for example, one or more of a buffer, a flash memory, a hard drive, a removable media, a volatile memory, a non-volatile memory, a random access memory (RAM), or other suitable device. In a typical arrangement, the memory 118 may include a non-volatile memory (e.g., a NAND or NOR architecture flash memory) for long term data storage and a volatile memory that functions as system memory for the control circuit 120. The volatile memory may be a RAM implemented with synchronous dynamic random access memory (SDRAM), for example. The memory 118 may exchange data with the control circuit 120 over a data bus. Accompanying control lines and an address bus between the memory 118 and the control circuit 120 also may be present.

The processing device 122 may execute code that implements the various functions of the electronic device 10. It will be apparent to a person having ordinary skill in the art of computer programming, and specifically in application programming for mobile telephones or other electronic devices, how to program a electronic device 10 to operate and carry out various logical functions.

Continuing to refer to FIGS. 1, 2, and 10, the electronic device 10 includes an antenna 124 coupled to a radio circuit 126. The radio circuit 126 includes a radio frequency transmitter and receiver for transmitting and receiving signals via the antenna 124. The radio circuit 126 may be configured to operate in a mobile communications system and may be used to send and receive data and/or audiovisual content. Receiver types for interaction with a mobile radio network and/or broadcasting network include, but are not limited to, global system for mobile communications (GSM), code division multiple access (CDMA), wideband CDMA (WCDMA), general packet radio service (GPRS), WiFi, WiMax, digital video broadcasting-handheld (DVB-H), integrated services digital broadcasting (ISDB), etc., as well as advanced versions of these standards. It will be appreciated that the antenna 124 and the radio circuit 126 may represent one or more than one radio transceivers.

The electronic device 10 further includes a sound signal processing circuit 128 for processing audio signals transmitted by and received from the radio circuit 126. Coupled to the sound processing circuit 128 are a speaker 130 and a microphone 132 that enable a user to listen and speak via the electronic device 10 as is conventional. The radio circuit 126 and sound processing circuit 128 are each coupled to the control circuit 120 so as to carry out overall operation. Audio data may be passed from the control circuit 120 to the sound signal processing circuit 128 for playback to the user. The audio data may include, for example, audio data from an audio file stored by the memory 118 and retrieved by the control circuit 120, or received audio data such as in the form of streaming audio data from a mobile radio service. The sound processing circuit 128 may include any appropriate buffers, decoders, amplifiers and so forth.

The display 30 may be coupled to the control circuit 120 by a video processing circuit 134 that converts video data to a video signal used to drive the display 30. The video processing circuit 134 may include any appropriate buffers, decoders, video data processors and so forth. The video data may be generated by the control circuit 120, retrieved from a video file that is stored in the memory 118, derived from an incoming video data stream that is received by the radio circuit 128 or obtained by any other suitable method.

The electronic device 10 may further include one or more I/O interface(s) 136. The I/O interface(s) 136 may be in the form of typical mobile telephone I/O interfaces and may include one or more electrical connectors. As is typical, the I/O interface(s) 136 may be used to couple the electronic device 10 to a battery charger to charge a battery of a power supply unit (PSU) 138 within the electronic device 10. In addition, or in the alternative, the I/O interface(s) 136 may serve to connect the electronic device 10 to a headset assembly (e.g., a personal handsfree (PHF) device) that has a wired interface with the electronic device 10. Further, the I/O interface(s) 136 may serve to connect the electronic device 10 to a personal computer or other device via a data cable for the exchange of data. The electronic device 10 may receive operating power via the I/O interface(s) 136 when connected to a vehicle power adapter or an electricity outlet power adapter. The PSU 138 may supply power to operate the electronic device 10 in the absence of an external power source.

The electronic device 10 also may include a system clock 140 for clocking the various components of the electronic device 10, such as the control circuit 120 and the memory 118.

The electronic device 10 also may include a position data receiver 144, such as a global positioning system (GPS) receiver, Galileo satellite system receiver or the like. The position data receiver 144 may be involved in determining the location of the electronic device 10.

The electronic device 10 also may include a local wireless interface 146, such as an infrared transceiver and/or an RF interface (e.g., a Bluetooth interface), for establishing communication with an accessory, another mobile radio terminal, a computer or another device. For example, the local wireless interface 146 may operatively couple the electronic device 10 to a headset assembly (e.g., a PHF device) in an embodiment where the headset assembly has a corresponding wireless interface.

Figure 11:
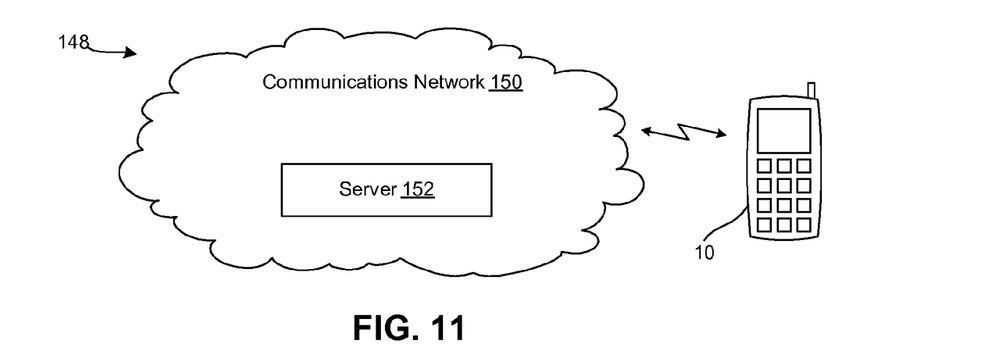
FIG. 11 is a schematic diagram of a communications system in which the electronic device of FIGS. 1 and 2 may operate.

With additional reference to FIG. 11, the electronic device 10 may be configured to operate as part of a communications system 148. The system 148 may include a communications network 150 having a server 152 (or servers) for managing calls placed by and destined to the electronic device 10, transmitting data to the electronic device 10 and carrying out any other support functions. The server 152 communicates with the electronic device 10 via a transmission medium. The transmission medium may be any appropriate device or assembly, including, for example, a communications tower (e.g., a cell tower), another mobile telephone, a wireless access point, a satellite, etc. Portions of the network may include wireless transmission pathways. The network 150 may support the communications activity of multiple electronic devices 10 and other types of end user devices. As will be appreciated, the server 152 may be configured as a typical computer system used to carry out server functions and may include a processor configured to execute software containing logical instructions that embody the functions of the server 152 and a memory to store such software.

Figure 12:
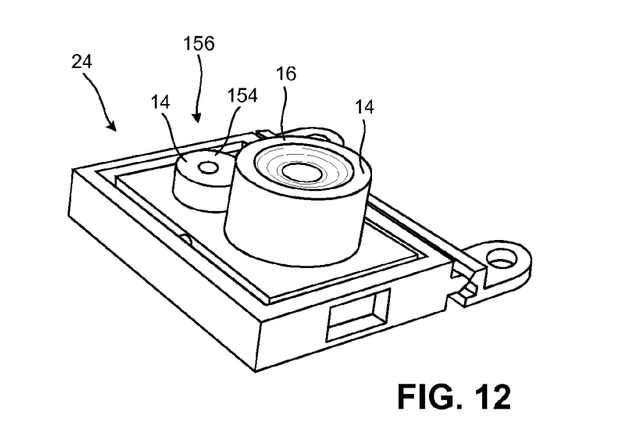
FIG. 12 is a perspective view of the stabilizer of FIG. 3 where plural optical devices are mounted on the stabilizer.

Referring now to FIG. 12, portions of the stabilizer 24 are shown in an arrangement where plural optical devices 14 are mounted on the platform 36 so that each of the optical devices 14 are stabilized against shake of the electronic device 10. In the illustrated embodiment, the optical devices 14 include the camera module 16 as described above and a laser diode 154. The laser diode 154 may be used to project a beam of light that may be used as a laser pointer 156. Laser pointers are commonly user by a speaker during a presentation to cast a spot of light onto a target to highlight the target. Commonly, the target is part of a presentation that is projected onto a screen or other surface for viewing by audience members.

Similar to the manner in which image quality may be improved by stabilizing the camera module 16, stabilizing the laser diode 154 may result in less movement of the spot of light. As many speakers have experienced, even small hand shake can result shaking or jostling of the spot of light moving. This type of movement of the spot of light (often referred to as "dancing") may be distracting to the audience members and, if the shaking is caused by nervousness of the speaker, may reveal the speaker's nervousness to the audience.

Unintended movement of the spot of light projected with the laser diode 154 may be eliminated or reduced by operation of the stabilizer 24 during projection of the light. A stabilized light spot may improve the quality of a speaker's presentation and self-confidence of the speaker. Also, by placing both the camera module 16 and the laser diode 154 on the stabilizer 24, little or no additional manufacturing cost may be added to the electronic device 10.

In one embodiment, disclosed is the incorporation of the laser pointer 156 into a mobile telephone. In this manner, the laser pointer 156 may be at the ready disposal of the speaker without the need to carry multiple devices. In addition, stabilizing the light from the laser pointer 156 is possible by mounting the light producing component (e.g., the laser diode 154) and/or projection optics (if present) on the stabilizer 24. Although FIG. 12 shows both the camera module 16 and the laser diode 154 mounted to the stabilizer 24, it will be appreciated that the camera module 16 may be omitted. To conserve power consumption, the stabilizer 24 may be deactivated when the laser pointer 156 is deactivated.

Figure 13:
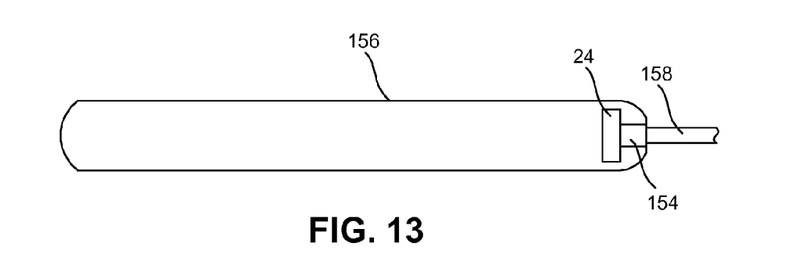
FIG. 13 is a schematic view of a laser pointer than includes a stabilized light source.

With additional reference to FIG. 13, an exemplary dedicated laser pointer 156 is shown. The laser pointer 156 includes the laser diode 154 for projecting a light beam 158. The laser diode 154 is mounted to the stabilizer 24 in the manner described above. In this arrangement, the light beam 158 that is projected by the laser pointer 156 may be stabilized to reduce or eliminate undesired movement of a spot of light that is generated by projecting the light beam 158 onto a surface.

Although certain embodiments have been shown and described, it is understood that equivalents and modifications falling within the scope of the appended claims will occur to others who are skilled in the art upon the reading and understanding of this specification.

What is claimed is:

1. A stabilizer for an optical device that forms part of an electronic device; comprising:
    a platform wherein the optical device is mounted on the platform;
    a gimbal mount that retains the platform so that the platform is pivotal about a first axis and the gimbal mount being further pivotal about a second axis so that the optical device is pivotal about both the first and second axes, and wherein the second axis is offset from a center line of the camera module;
    a first actuator that is controlled to manage movement of the optical device about the first axis;
    a second actuator that is controlled to manage movement of the optical device about the second axis;
    a gyro sensor mounted with respect to the platform and wherein the gyro sensor outputs signals indicative of movement of the optical device about the first and second axes: and
    a controller that controls the first and second actuators in accordance with the output signals of the gyro sensor and the controller controls the first and second actuators to minimize change in the output signals from the gyro sensor;
    wherein the stabilizer does not include a position sensor to provide input to a controller indicative of relative position of any of the camera module, the platform or the gimbal mount.

2. The stabilizer of claim 1, wherein the gimbal mount is hingably connected to a mounting bracket that is secured to a printed circuit board of the electronic device.

3. The stabilizer of claim 1, wherein the optical device is an illumination source for generating a light beam to be used by a user of the electronic device as a pointer.

4. The stabilizer of claim 1, wherein the actuators are piezoelectric actuators.

5. The stabilizer of claim 1, wherein the electronic device is a mobile telephone.

6. The stabilizer of claim 5, wherein the optical device is a camera module that includes a sensor and at least one focusing lens.

7. The stabilizer of claim 5, wherein the optical device is an illumination source for generating a light beam to be used by a user of the electronic device as a pointer.

8. The stabilizer of claim 7, wherein the illumination source is a laser diode.

9. The stabilizer of claim 1, wherein the optical device is a camera module that includes a sensor and at least one focusing lens.

10. The stabilizer of claim 9, wherein the first axis travels through the center line of the camera module.

11. The stabilizer of claim 9, wherein the first axis and the second axis have different elevations with respect to the camera module.

12. The stabilizer of claim 9, wherein the second axis is laterally spaced apart from a periphery of the camera module.

13. The stabilizer of claim 1, wherein there are two optical devices mounted on the platform.

14. The stabilizer of claim 13, wherein the optical devices are a camera module and an illumination source.

15. The stabilizer of claim 1, wherein the actuators are electromagnetic actuators.

16. The stabilizer of claim 15, wherein the first actuator has a magnet and a coil that are mounted with respect to the platform to control movement about the first axis and the second actuator has a magnet and a coil that are mounted with respect to the gimbal mount to control movement about the second axis.

17. The stabilizer of claim 1, wherein the actuators are shape memory alloy (SMA) actuators.

18. The stabilizer of claim 17, wherein the first actuator has an SMA member connected between the gimbal mount and the platform to control movement about the first axis and the second actuator has an SMA member connected between the gimbal mount and a fixed point to control movement about the second axis.

\* \* \* \* \*